US008339819B2

(12) United States Patent
Miyazaki

(10) Patent No.: US 8,339,819 B2
(45) Date of Patent: Dec. 25, 2012

(54) BOOSTER CIRCUIT AND DISPLAY DEVICE

(75) Inventor: Kiyoshi Miyazaki, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 441 days.

(21) Appl. No.: 12/656,515

(22) Filed: Feb. 1, 2010

(65) Prior Publication Data

US 2010/0207929 A1 Aug. 19, 2010

(30) Foreign Application Priority Data

Feb. 4, 2009 (JP) ................................ 2009-024211

(51) Int. Cl.
*H02M 3/18* (2006.01)

(52) U.S. Cl. ........................................... 363/60; 363/59

(58) Field of Classification Search .................... 363/59, 363/60; 323/268, 271, 282, 285; 327/536, 327/538

See application file for complete search history.

(56) References Cited

U.S. PATENT DOCUMENTS 7,888,989 B2 * 2/2011 Lin et al. ........................ 327/536
8,040,701 B2 * 10/2011 Oyama et al. .................... 363/60
2010/0321099 A1 * 12/2010 Hsieh et al. .................. 327/536

FOREIGN PATENT DOCUMENTS

JP 2005-278383 10/2005

* cited by examiner

*Primary Examiner* — Matthew Nguyen
(74) *Attorney, Agent, or Firm* — McGinn IP Law Group, PLLC

(57) ABSTRACT

A booster circuit has: a charge pump configured to perform a booster operation that boosts a voltage supplied from an external power source and outputs the boosted voltage as an output voltage through an output capacitor; and a feedback circuit section configured to control the booster operation depending on the output voltage. A mode of the booster operation includes: a charge mode that charges the output capacitor with the voltage supplied from the external power source; and a discharge mode that discharges the output capacitor. The mode of the booster operation is switched between the charge mode and the discharge mode depending on the output voltage. The feedback circuit section has a booster operation control section that secures a period during which the mode is not switched between the charge mode and the discharge mode in accordance with an external synchronizing signal.

5 Claims, 15 Drawing Sheets

BOOSTER CIRCUIT AND DISPLAY DEVICE

INCORPORATION BY REFERENCE

This application is based upon and claims the benefit of priority from Japanese patent application No. 2009-024211, filed on Feb. 4, 2009, the disclosure of which is incorporated herein in its entirety by reference.

BACKGROUND OF THE INVENTION

1. Field of the Invention

The present invention relates to a booster circuit, particularly to a booster circuit having a feedback circuit section.

2. Description of Related Art

In recent years, power consumption of a display device such as a liquid crystal display device is getting lower. A booster circuit is often used as a power source for such a display device. Although a simple charge pump circuit that operates continuously exists, a power source having a higher efficiency and lower power consumption is used more frequently for a built-in power source of the display device. Because of this situation, a charge pump circuit that has a feedback circuit section and performs a booster operation depending on load and output variation has been increasingly used.

FIG. 1 and FIG. 2 are circuit diagrams showing a typical feedback-type booster circuit. The typical feedback-type booster circuit will be described below with reference to FIGS. 1 and 2.

As shown in FIGS. 1 and 2, the booster circuit has a charge pump 10, a feedback circuit section 20 and a logic circuit section 30. The charge pump 10 has a DC/DC converter 11, a booster capacitor (C1) 12 and an output capacitor (CL) 13. The DC/DC converter 11 has a voltage input section 111, a clock signal input section 113 and a booster voltage output section 112. The feedback circuit section 20 has a voltage dividing circuit section 24, a comparison circuit section 21 and a reference voltage source section 22. The voltage dividing circuit section 24 has a first fixed resistor (R1) 241, a voltage dividing node 240 and a second fixed resistor (R2) 242. The comparison circuit section 21 has a comparator 210. The reference voltage source section 22 has a reference voltage source 220. The logic circuit section 30 has an external clock signal input section 31.

The voltage input section 111 is connected to the DC/DC converter 11. The DC/DC converter 11 is further connected to an output section of the logic circuit section 30, both terminals of the booster capacitor 12 and the booster voltage output section 112. The booster voltage output section 112 is further connected to the output capacitor 13 and an input section of the feedback circuit section 20. The output capacitor 13 is also connected to a ground 19. An output section of the feedback circuit section 20 and the external clock signal input section 31 are connected to two input sections of the logic circuit section 30, respectively.

In the feedback circuit section 20, the input section is connected to the second fixed resistor 242 in the voltage dividing circuit section 24. The second fixed resistor 242 is also connected to the voltage dividing node 240 at the other end thereof. The voltage dividing node 240 is further connected to the first fixed resistor 241 and an inverted side input section of the comparator 210. The first fixed resistor 241 is also connected to a ground 249 at the other side thereof. The reference voltage source 220 is connected to a non-inverted side input section of the comparator 210. The reference voltage source 220 is also connected to a ground 229 at the other end thereof. An output section of the comparator 210 is connected to the output section of the feedback circuit section 20.

A basic operation of the DC/DC converter 11 in the present specification will be described below.

An operation mode of the DC/DC converter 11 in a case where a clock signal CLKIN input to the clock signal input section 113 is in the Low state is referred to as a "discharge mode".

In the discharge mode, the DC/DC converter 11 allows a positive electrode of the booster capacitor 12 to be connected to the voltage input section 111. In other words, the booster capacitor 12 is charged with a voltage VIN supplied from the voltage input section 111.

At the same time, the DC/DC converter 11 allows a positive electrode of the output capacitor 13 to be connected to the booster voltage output section 112. In other words, the output capacitor 13 discharges electric power to an arbitrary external device connected to the booster voltage output section 112.

On the other hand, an operation mode of the DC/DC converter 11 in a case where the clock signal CLKIN input to the clock signal input section 113 is in the High state is referred to as a "charge mode".

In the charge mode, the DC/DC converter 11 allows a negative electrode of the booster capacitor 12 to be connected to the voltage input section 111. Also, the DC/DC converter 11 allows the positive electrode of the booster capacitor 12 to be connected to the positive electrode of the booster voltage output section 112. At this time, the booster capacitor 12 has been already charged with the voltage of the voltage input section 111 in the discharge mode. Thus, the voltage input section 111 and the booster capacitor 12 that are serially connected charge the output capacitor 13. In other words, electrical charges in the booster capacitor 12 are shared with the output capacitor 13. As a result, the output capacitor 13 is charged with a voltage which is twice as much as the voltage of the voltage input section 111.

The DC/DC converter 11 which performs an operation in an opposite phase to that in the example shown in FIG. 2 can be easily realized by basically inverting the logic in this circuit. Furthermore, a booster ratio, the number of the used various capacitors and the type and total number of the operation modes can be changed in many ways. Description of these changes can be easily inferred and thus, is omitted.

Next, an operation of the feedback circuit section 20 shown in FIG. 2 will be described.

First, the voltage dividing circuit section 24 divides a voltage VOUT of the booster voltage output section 112 and outputs the divided voltage from the voltage dividing node 240. The voltage output from the voltage dividing node 240 is hereinafter referred to as a "feedback voltage VFB". At this time, the booster voltage output section 112, the second fixed resistor (R2) 242, the voltage dividing node 240, the first fixed resistor (R1) 241 and the ground 249 are connected in series. The feedback voltage VFB is a voltage between both nodes of the first fixed resistor 241. Therefore, the feedback voltage VFB can be represented by the following Equation (1).

$$VFB = VOUT \times R1/(R1+R2) \quad \text{<Equation (1)>}$$

A coefficient R1/(R1+R2) in the right side of the Equation (1) is hereinafter referred to as a "voltage dividing ratio".

Next, the feedback voltage VFB is input to an inverted side input section of the comparator 210 in the comparison circuit section 21. The comparator 210 compares the feedback voltage VFB with a reference voltage VREF of the reference voltage source 220 connected to the non-inverted side input section of the comparator 210. The comparison circuit section 21 outputs a result of the comparison between the voltages as a feedback signal EN. For example, the feedback signal EN is in the Low state in a case where the feedback voltage VFB is higher than the reference voltage VREF (VFB>VREF). In the other cases, the feedback signal EN is in the High state.

The feedback signal EN is supplied to the logic circuit section 30. An external clock signal CLK is further supplied from the external clock signal input section 31 to the logic circuit section 30. When the feedback signal EN is in the High state and the external clock signal CLK is in the High state, the clock signal CLKIN output from the logic circuit section 30 is in the High state (charge mode). Electrical charges in the booster capacitor 12 are supplied to the output capacitor 13. As a result, the booster operation of the charge pump 10 is performed.

When the external clock signal CLK is in the Low state or the feedback signal EN is in the Low state, the clock signal CLKIN output from the logic circuit section 30 is in the Low state (discharge mode). The booster operation is turned OFF, and the output capacitor is discharged. Also, the booster capacitor 12 is charged with the input voltage VIN supplied from the voltage input section 111, in preparation for the next booster operation.

The feedback signal EN is output from the comparator 210 which compares the feedback voltage VFB with the reference voltage VREF. In other words, timing when the feedback signal EN is switched is determined by the operation of the comparator 210. Specifically, the feedback signal EN is switched when a relationship represented by the following Equation (2) is satisfied. In other words, the comparator 210 operates so as to keep a relationship represented by the following Equation (3).

$$VREF=VFB=VOUT\times R1/(R1+R2) \quad \text{<Equation 2>}$$

$$VOUT=VREF\times(1+R2/R1) \quad \text{<Equation 3>}$$

The value of the right side of the Equation (3) is hereinafter referred to as a "set voltage".

In a case where the output voltage VOUT is higher than the above-mentioned set voltage, the feedback signal EN is in the Low state. When the feedback signal EN is in the Low state, the clock signal CLKIN input to the DC/DC converter 11 is in the Low state, irrespective of the external clock signal CLK. As a result, the booster operation is stopped. At this time, in the case shown in FIG. 2, the booster capacitor 12 is charged.

In a case where the output voltage VOUT is lower than the above-mentioned set voltage, the feedback signal EN is in the High state. Furthermore, when the external clock signal CLK which operates the booster circuit is in the High state, the booster operation is performed. In other words, charging and discharging of each capacitor are repeated.

In the case shown in FIG. 2, since a logical operation of the external clock signal CLK and the feedback signal EN is performed, the DC/DC converter 11 does not necessarily operate in synchronization with the external clock signal CLK. For example, let us consider a case where a period during which the feedback signal EN is in the High state is a half of a period during which the external clock signal CLK is in the High state. In this case, the discharge operation of the booster capacitor 12 is performed for a half of the period during which the external clock signal CLK is in the High state.

However, a current at the time when electrical charges in the booster capacitor 12 are discharged to the output capacitor 13 may not correspond to a current at the time when electrical charges in the output capacitor 13 are discharged to the external load. Furthermore, since a reaction speed of the feedback circuit section 20 including the comparator 210 is limited, a waveform of the output voltage VOUT includes ripple noise which fluctuates across the above-mentioned set voltage.

FIG. 3 is a waveform diagram for explaining the waveform of the output voltage VOUT including the ripple noise and influence of the ripple noise on a display waveform of a display device. In FIG. 3, the horizontal axis represents time and the vertical axis represents voltage. The set voltage is indicated by a broken line. The details will be described later.

Japanese Patent Publication JP-2005-278383A discloses a power supply circuit. In the power supply circuit, a comparator makes a comparison between a reference voltage and a voltage depending on an output of a charge pump which performs the booster operation in accordance with a clock signal. A pulse of the clock signal is skipped by the output of the comparator at the time when the voltage exceeds the reference voltage to stop the booster operation. The skip of the pulse of the clock signal is stopped by the output of the comparator at the time when the voltage falls below the reference voltage to restart the booster operation, thereby outputting a regulated voltage from the charge pump. Here, a speed of the comparator is controlled so as to be high from the time when the voltage depending on the output of the charge pump exceeds the reference voltage to the time when the output of the comparator is inverted. Also, the speed of the comparator is controlled so as to be low from the time when the voltage depending on the output of the charge pump falls below the reference voltage to the time when the output of the comparator is inverted.

The inventor of the present application has recognized the following points.

As mentioned above, the output voltage VOUT of the feedback-control-type booster circuit has the ripple waveform. A negative effect of this phenomenon on an actual display panel will be described below.

FIG. 4 is a circuit diagram showing a liquid crystal display panel system using the booster circuit shown in FIG. 2. The liquid crystal display panel system in FIG. 4 has an LCD (Liquid Crystal Display) driver and a liquid crystal display panel. As shown in FIG. 4, the voltage output from the booster circuit is used as power source for the LCD driver in the liquid crystal display panel system. The LCD driver has amplifying buffers for driving a predetermined voltage to the liquid crystal display panel.

The liquid crystal display panel shown in FIG. 4 has a plurality of pixels. Each of the plurality of pixels has an FET (Field Effect Transistor). Scan signal lines G1, G2, . . . used for transmitting a gate control signal are connected to gates of the plurality of FETs, respectively. Data lines S1, S2, . . . for transmitting a source line signal are connected to sources of the plurality of FETs, respectively. Here, the gate control signal is used for driving each pixel of the liquid crystal display panel. The source line signal is used for applying a voltage corresponding to data displayed at each pixel of the liquid crystal display panel.

The (A) part of FIG. 3 is a waveform diagram showing the gate control signals of the scan signal lines G1, G2 and G3, the source line signal of the data line S1, and the output voltage VOUT of the booster circuit for driving the liquid crystal display panel. Here, the gate control signal is in synchronization with the source line signal. The (B) part of FIG. 3 is a magnified diagram of a part of the (A) part, which illustrates in more detail the gate control signal of the scan signal line G1, the source line signal of the data line S1, and the output voltage VOUT of the booster circuit.

FIG. 5 is a diagram for explaining an influence of the noise of the driver power source on the liquid crystal display device. The plurality of scan signal lines G1, G2, . . . are activated one by one in order. When a scan signal line is activated, all pixels connected to the activated scan signal lines are activated. An analog value output from the source driver is written to the activated pixels through the data lines.

The transistor of each pixel is turned ON in synchronization with the gate control signal. When the transistor of each pixel is turned ON, a load capacitor of the each pixel is charged. Thus, a load current of each pixel is in synchronization with the gate control signal. However, electrical charges charged to each pixel vary depending on an image displayed at this time. That is to say, the load current varies for each display line and the amount of charge consumption is irregular.

Therefore, a timing of starting the booster operation for boosting the output voltage VOUT that has been decreased due to the load driving also is irregular and, in many cases, not in synchronization with the display operation. The waveform shown in FIG. 3 is an example. The rising waveform is steep. In order to increase the electrical charges stored in the booster capacitor 12, the negative electrode terminal is switched to the voltage input section 111. Since the switching operation is performed for sharing the electrical charges with the booster voltage output section 112, the voltage waveform becomes steep in the AC manner. In addition, a low impedance of a booster SW also contributes to the steep voltage waveform.

On the other hand, the discharging is averagely performed through the output capacitor 13 which operates as a bypass capacitor. Furthermore, the discharging is performed with a current limited by an amplifier output impedance and the liquid crystal display panel load. The discharging charges are less than that in the booster capacitor. For these reasons, the waveform is averagely smooth.

Due to the above-described asynchronous and steep rising, a steep rising ripple noise occurs in the output voltage VOUT if the booster operation based on the discharging of the booster capacitor 12 starts immediately before switching of the scan signal lines. Moreover, the noise is transmitted to the output of the amplifier that uses the output voltage VOUT output from the booster voltage output section 112 as the power source. Especially when this occurs immediately before completion of scanning as shown in FIG. 3, it is difficult to return the voltage to a predetermined voltage by the amplifier, which results in that a voltage shifted from the predetermined voltage is applied to the source line.

FIG. 5 shows a state where the power source noise affects the pixels of the liquid crystal display panel. In fact, not all the power source noise is applied to the driver outputs (S1, S2, . . . ), and a part thereof depending on power-source-noise-removal-ratio of the amplifier appears as the output. Accordingly, the noise applied to the source line is generally smaller than the actual power source noise by about one digit.

However, the higher-definition and higher-contrast liquid crystal display panel in recent years requires further precision for the LCD driver amplifier. Therefore, the influence of the above-mentioned noise cannot be ignored. Specifically, the above-mentioned noise is irregularly applied and hence the voltage is irregularly shifted from the predetermined voltage, which causes line flicker in screen during display.

SUMMARY OF THE INVENTION

In one embodiment of the present invention, a booster circuit is provided. The booster circuit has: a charge pump configured to perform a booster operation that boosts a voltage supplied from an external power source and outputs the boosted voltage as an output voltage through an output capacitor; and a feedback circuit section configured to control the booster operation of the charge pump depending on the output voltage. A mode of the booster operation includes: a charge mode that charges the output capacitor with the voltage supplied from the external power source; and a discharge mode that discharges the output capacitor. The mode of the booster operation is switched between the charge mode and the discharge mode depending on the output voltage. The feedback circuit section comprises a booster operation control section configured to secure a period during which the mode is not switched between the charge mode and the discharge mode in accordance with an external synchronizing signal.

In another embodiment of the present invention, a display panel is provided. The display device has: a display panel having a plurality of scan lines; and a booster circuit configured to generate an output voltage and to supply the output voltage as power source to the display panel. The booster circuit has: a charge pump configured to perform a booster operation that boosts a voltage supplied from an external power source and outputs the boosted voltage as the output voltage through an output capacitor; and a feedback circuit section configured to control the booster operation of the charge pump depending on the output voltage. A mode of the booster operation includes: a charge mode that charges the output capacitor with the voltage supplied from the external power source; and a discharge mode that discharges the output capacitor. The mode of the booster operation is switched between the charge mode and the discharge mode depending on the output voltage. The feedback circuit section comprises a booster operation control section configured to secure a period during which the mode is not switched between the charge mode and the discharge mode in accordance with an external synchronizing signal. The period includes a timing at which an active scan line is switched among the plurality of scan lines.

In still another embodiment of the present invention, a method of driving a display panel is provided. The method includes: generating, by using a charge pump, a booster voltage from a voltage supplied from an external power source; and supplying the booster voltage as power source to the display panel. The generating the booster voltage comprises: activating, in a charge mode, the charge pump to perform a booster operation that boosts the voltage supplied from the external power source; deactivating, in a discharge mode, the charge pump to stop the booster operation; switching a mode between the charge mode and the discharge mode depending on the booster voltage; and securing a period during which the mode is not switched between the charge mode and the discharge mode in accordance with an external synchronizing signal. The period includes a timing which an active scan line is switched among a plurality of scan lines of the display panel.

A booster circuit according to the present invention shifts a feedback voltage in accordance with an external synchronizing signal. That is, the booster circuit controls a timing of the feedback control operation by using a plurality of threshold values. When the booster circuit of the present invention is used as a power supply circuit for a display device, the booster operation is restricted in the vicinity of a switching timing of the scan signal of the display device. Since a point at which the output of the booster circuit steeply rises can be shifted away from a timing at which a display signal is written to a pixel, it is possible to prevent the display from being influenced by the noise due to the operation of the booster circuit.

Note that the plurality of threshold values used here can be achieved by previously setting an arbitrary voltage.

BRIEF DESCRIPTION OF THE DRAWINGS

The above and other objects, advantages and features of the present invention will be more apparent from the following description of certain preferred embodiments taken in conjunction with the accompanying drawings, in which.

DESCRIPTION OF PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

(First Embodiment)

Figure 1:
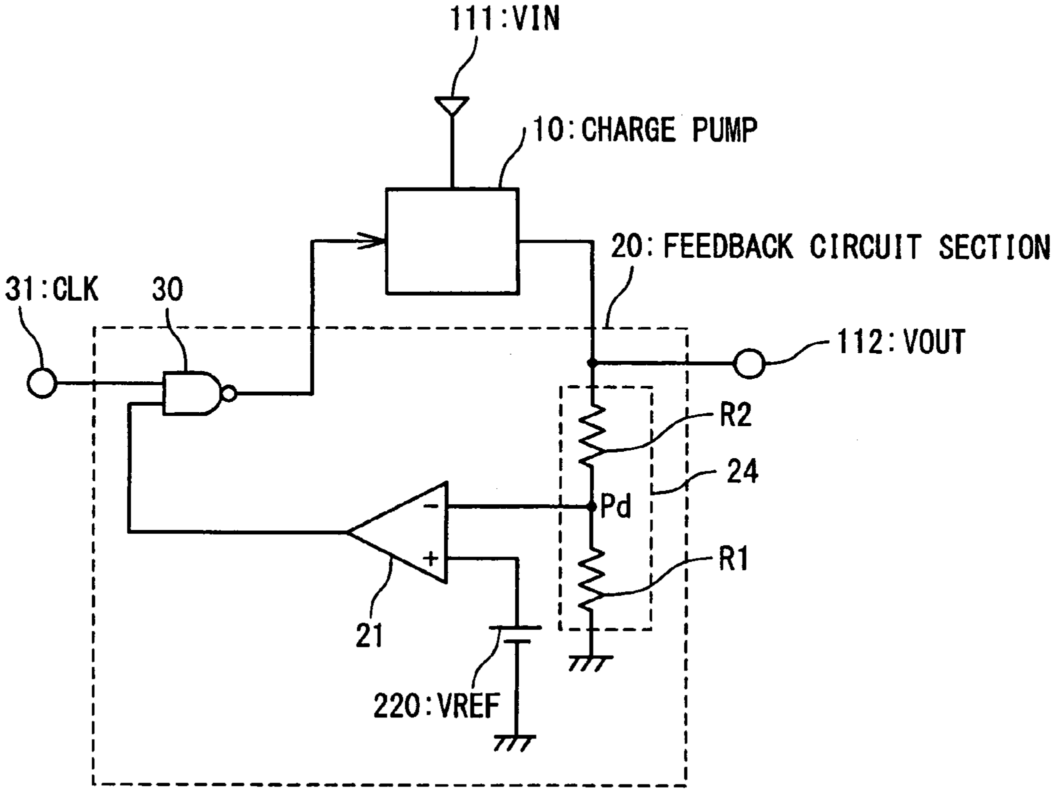
FIG. 1 is a circuit diagram showing a typical feedback-type booster circuit.
Figure 2:
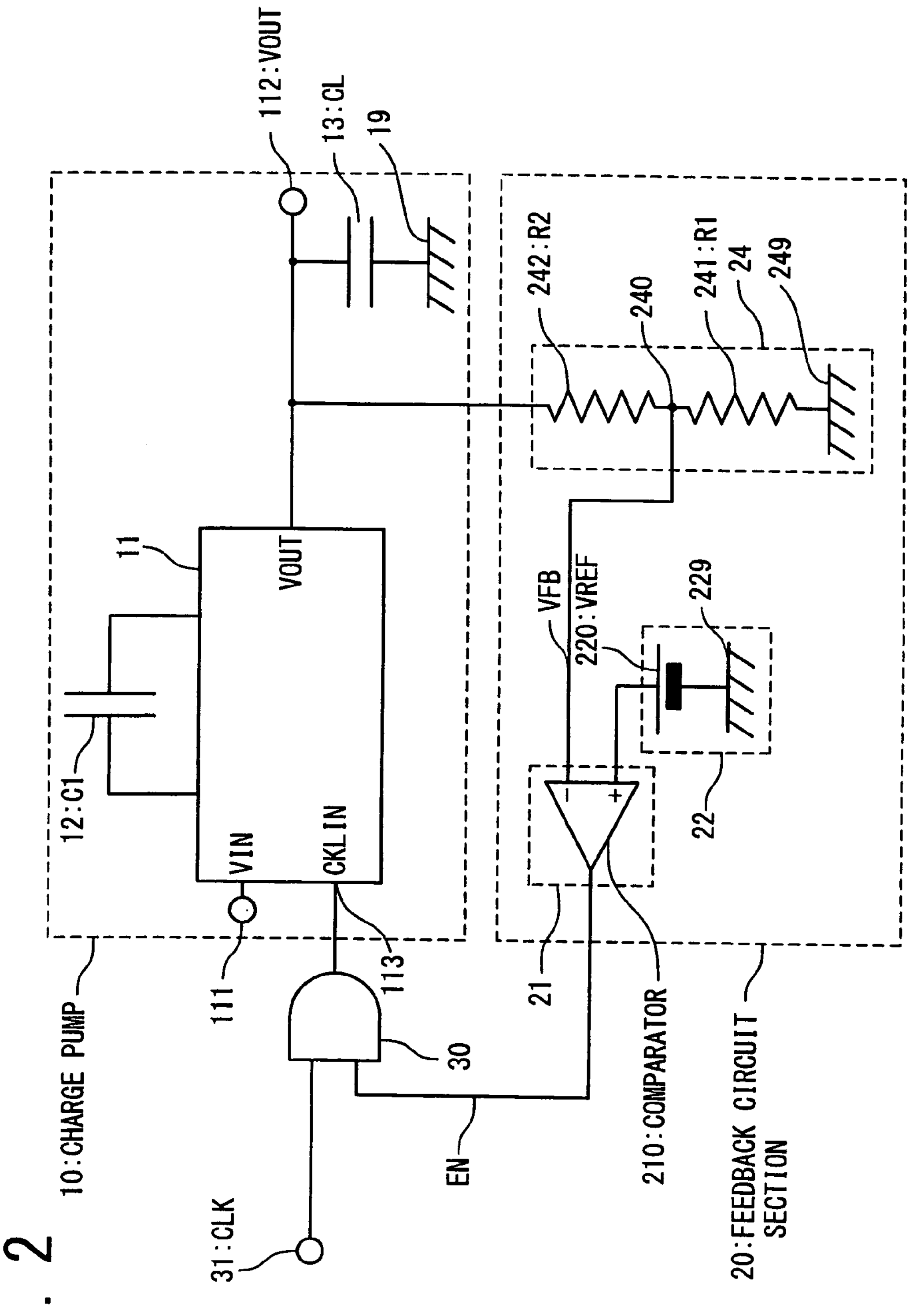
FIG. 2 is a circuit diagram showing the typical feedback-type booster circuit.
Figure 3:
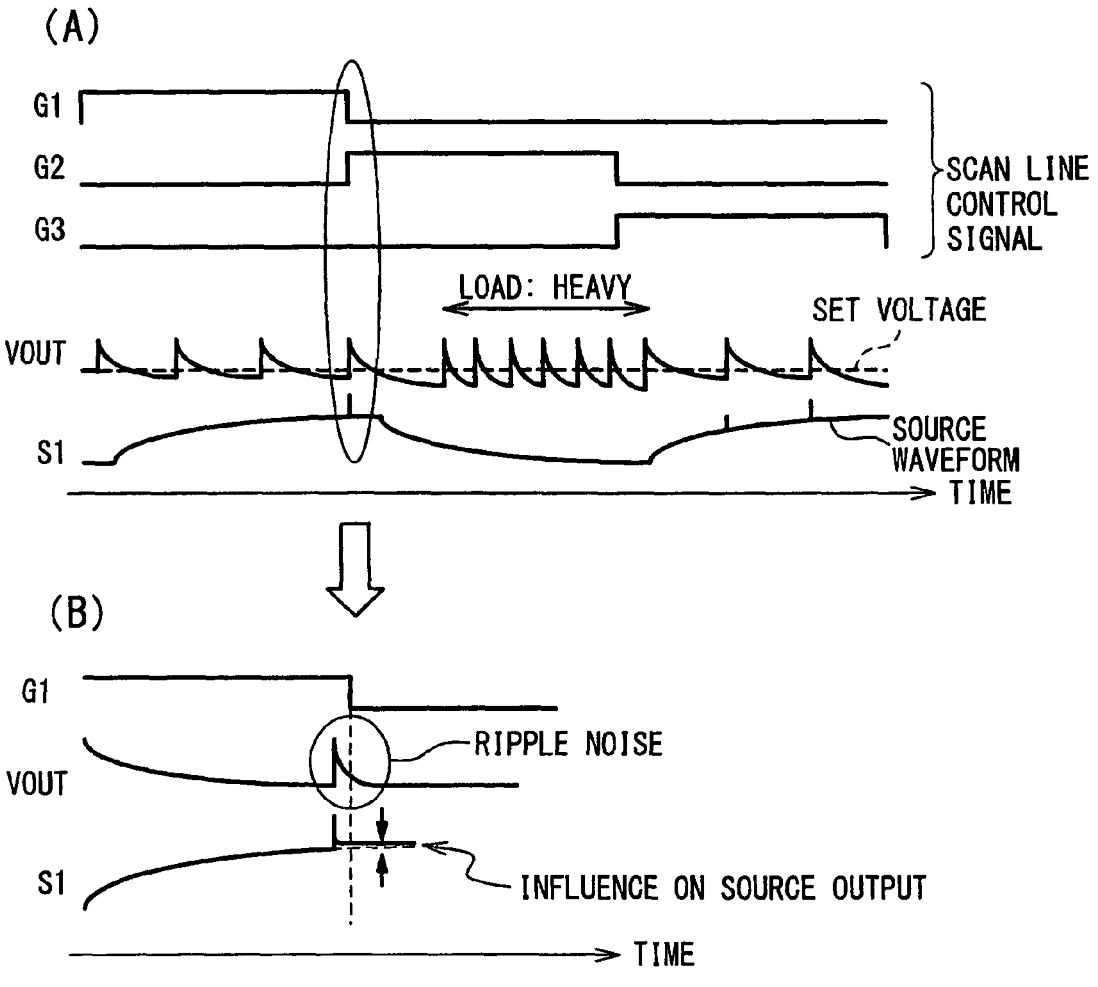
FIG. 3 is a waveform diagram for explaining a waveform of an output voltage VOUT including a ripple waveform and an influence of the ripple waveform on a display waveform. The (A) part is a waveform diagram showing gate control signals of scan signal lines G1, G2 and G3, a source line signal of a data line S1, and the output voltage VOUT of the booster circuit. The (B) part is a magnified diagram which illustrates in more detail the gate control signal of the scan signal line G1, the source line signal of the data line S1, and the output voltage VOUT of the booster circuit.
Figure 4:
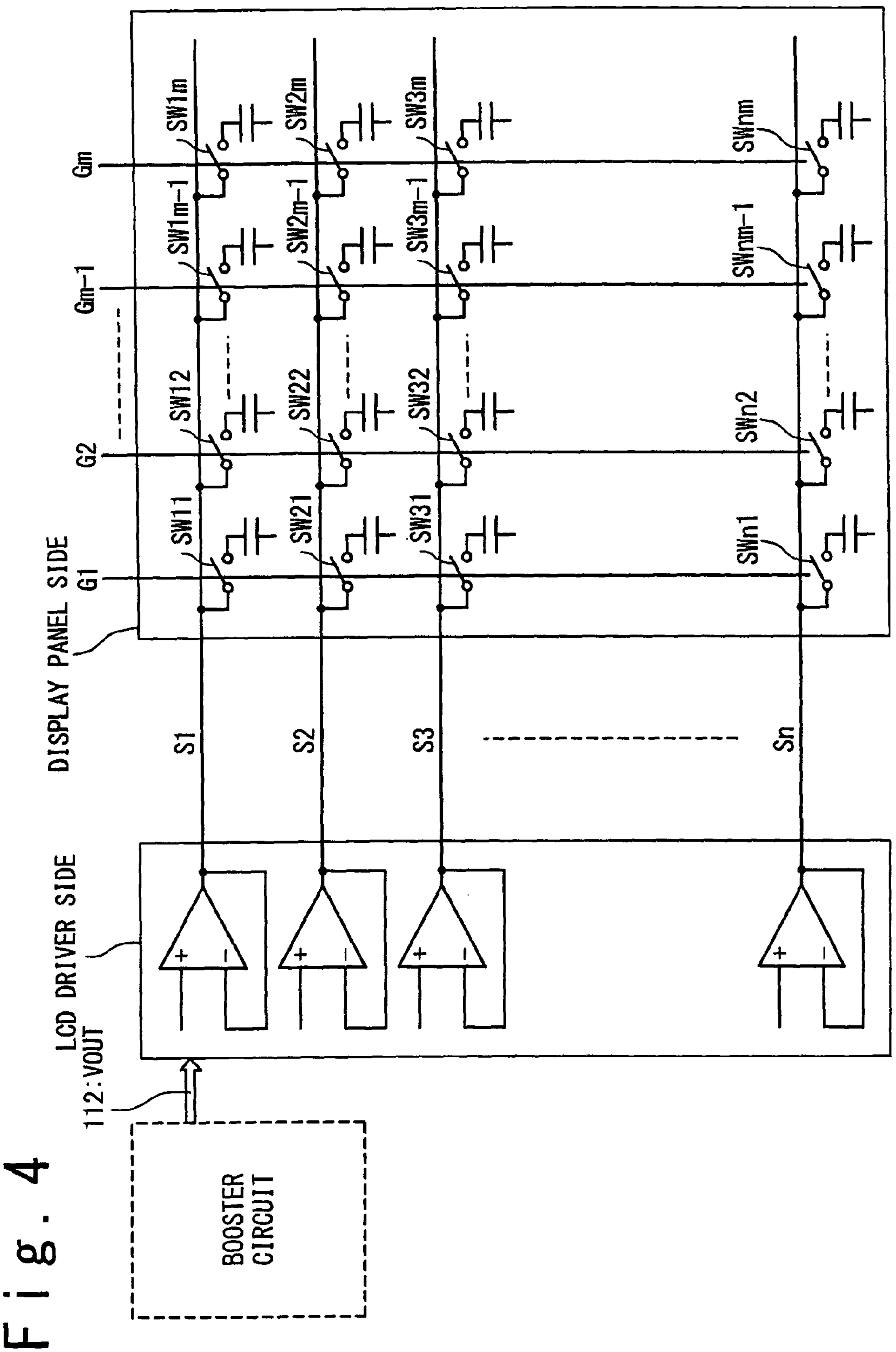
FIG. 4 is a circuit diagram of a display system using the booster circuit shown in FIG. 2.
Figure 5:
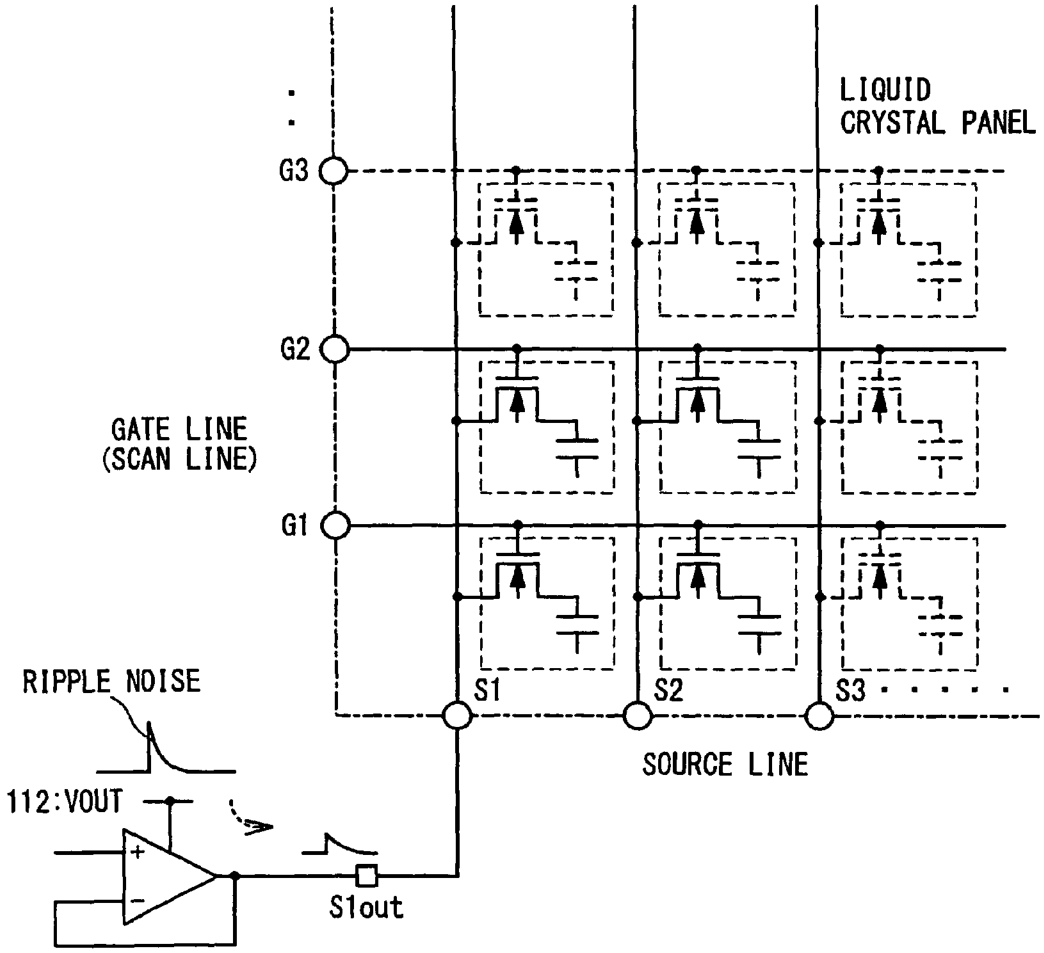
FIG. 5 is a diagram for explaining influence of noise of a driver power source on a liquid crystal display device.
Figure 6A:
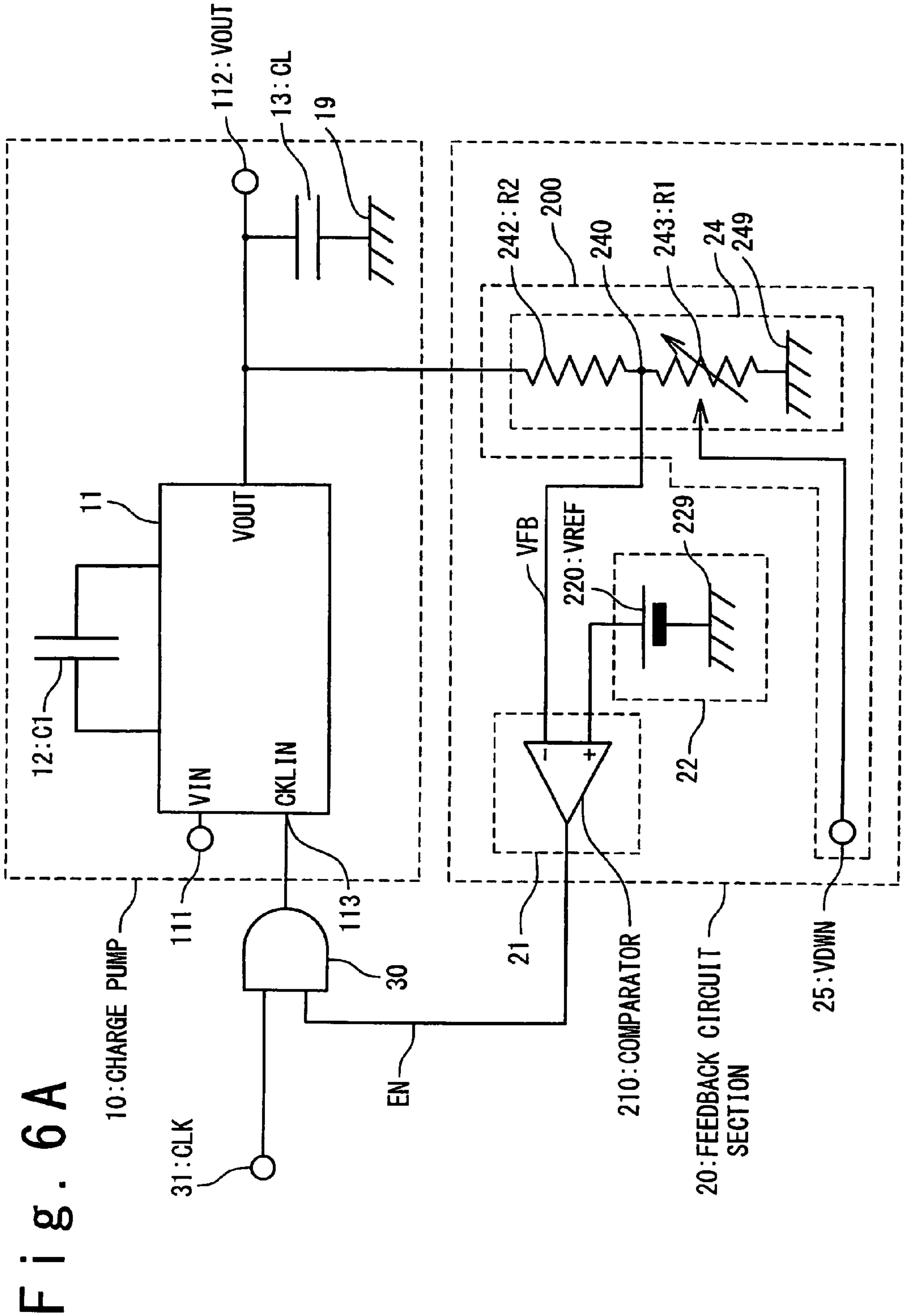
FIG. 6A is a circuit diagram showing a booster circuit according to a first embodiment of the present invention.
Figure 6B:
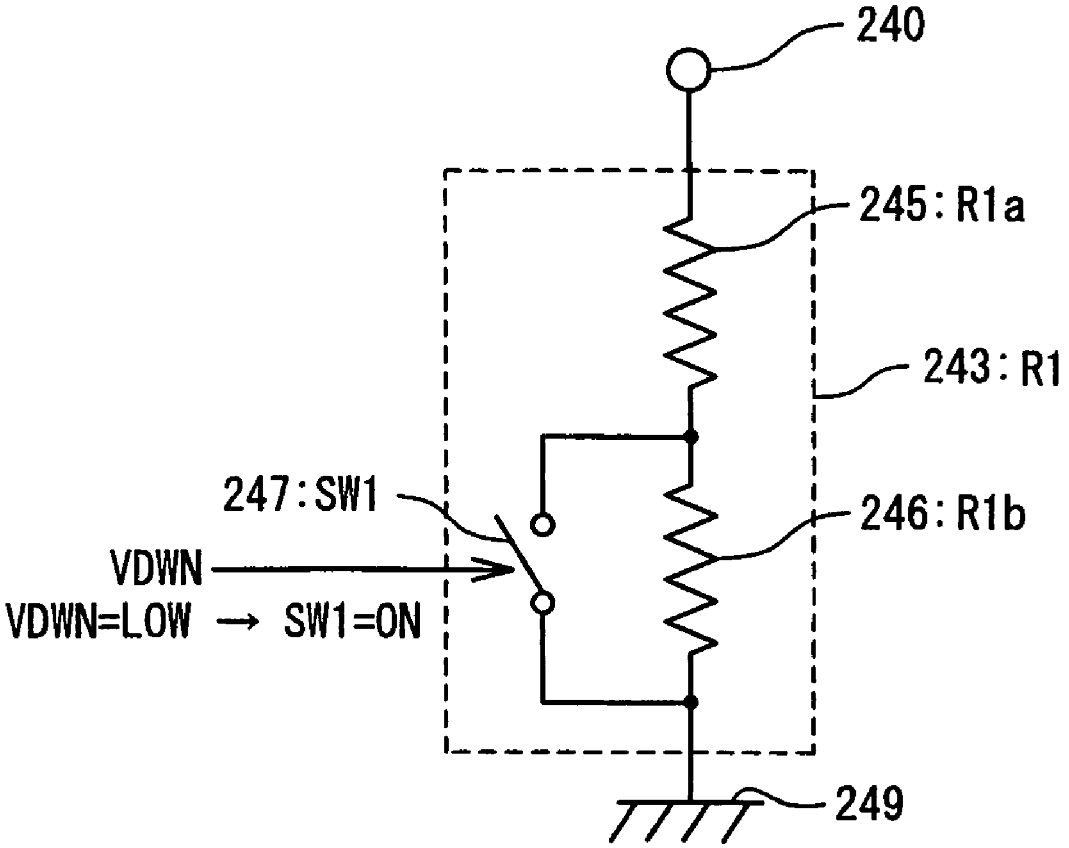
FIG. 6B is a detailed circuit diagram showing a voltage dividing circuit section 24 in the booster circuit according to the first embodiment.

FIG. 6A is a circuit diagram showing the booster circuit according to a first embodiment of the present invention. FIG. 6B is a detailed circuit diagram showing a voltage dividing circuit section 24 in the booster circuit according to the first embodiment.

The booster circuit according to the present embodiment has a charge pump 10, a feedback circuit section 20 and a logic circuit section 30. The charge pump 10 has a DC/DC converter 11, a booster capacitor (C1) 12 and an output capacitor (CL) 13. The DC/DC converter 11 has a voltage input section 111, a clock input section 112 and a booster voltage output section 112. The feedback circuit section 20 has a voltage dividing circuit section 24, a comparison circuit section 21, a reference voltage source section 22 and an external synchronizing signal input section 25 and a booster operation control section 200. The booster operation control section 200 in the present embodiment has the voltage dividing circuit section 24 and the external synchronizing signal input section 25. The comparison circuit section 21 has a comparator 210. The voltage dividing circuit section 24 has a variable resistor (R1) 243 and a fixed resistor (R2) 242. The variable resistor 243 includes two fixed resistor 245 (R1*a*) and 246 (Rib) and a switch (SW1) 247. The switch 247 is a Low active type. In other words, when an external synchronizing signal VDWN supplied from an external synchronizing signal output section is in the Low state (activated state), the switch is in a conductive state and the fixed resistor 246 is short-circuited, resulting in R1=R1*a*. Conversely, when the external synchronizing signal VDWN is in the High state (deactivated state), the switch 247 is in a non-conductive state, resulting in R1=R1*a*+R1*b*.

The charge pump 10 is connected to an external voltage source at the voltage input section 111. The charge pump 10 is further connected to an input section of the feedback circuit section 20 at the booster voltage output section 112. The charge pump 10 is further connected to an output section of the logic circuit section 30 at the clock input section 113. The feedback circuit section 20 is connected to an input section of the logic circuit 30 at an output thereof. The feedback circuit section 20 is also connected to the external synchronizing signal output section. The logic circuit section 30 is further connected to an external clock signal output section at the external clock signal input section 31.

A configuration of the charge pump 10 will be described below. A voltage input section of the charge pump 10 is connected to a voltage input section of the DC/DC converter 11. The DC/DC converter 11 is further connected to both ends of the booster capacitor 12. The DC/DC converter 11 is further connected to the booster voltage output section 112 at a voltage output section thereof. The DC/DC converter 11 is further connected to the output section of the logic circuit section 30 at the clock signal input section 113. One end of the output capacitor 13 is connected to the booster voltage output section 112. The other end of the output capacitor 13 is connected to a ground 19.

A configuration of the feedback circuit section 20 will be described below. The voltage dividing circuit section 24 is connected to an input section of the feedback circuit section 20. The voltage dividing circuit section 24 is further connected to one input section of the comparison circuit section 21 at the voltage dividing node 240. The reference voltage source section 22 is connected to the other input section of the comparison circuit section 21. An output section of the comparison circuit section 21 is connected to an output section of the feedback circuit section 20.

A configuration of the logic circuit section 30 will be described below. The output section of the feedback circuit section 20 is connected to the input section of the logic circuit section 30. The external clock signal output section is connected to the external clock signal input section 31 of the logic circuit section 30. The clock input section 113 of the charge pump 10 is connected to the output section of the logic circuit section 30.

A configuration of the voltage dividing circuit section 24 will be described below. A ground 249, the variable resistor (R1) 243, the voltage dividing node 240, the fixed resistor (R2) 242 and the booster voltage output section 112 of the charge pump 10 are serially connected in this order. The input section of the comparison circuit section 21 is connected to the voltage dividing node 240. The voltage at the voltage dividing node 240 is referred to as the "feedback voltage VFB".

A configuration of the variable resistor (R1) 243 will be described below with reference to FIG. 6B. The fixed resistor (R1*a*) 245 and the fixed resistor (R1*b*) 246 are connected in series. The switch 247 is connected to the fixed resistor 246 in parallel. The switch 247 is further connected to the external synchronizing signal input section 25 at a control section thereof. Accordingly, the voltage dividing ratio of the voltage dividing circuit section 24 varies in response to change in the external synchronizing signal VDWN. It should be noted that the configuration of the voltage dividing circuit section 24 shown in FIGS. 6A and 6B is merely an example, and the other configuration is also possible as long as the voltage dividing ratio varies depending on the external synchronizing signal VDWN.

A configuration of the comparison circuit section 21 will be described below. The comparator 210 is connected to the voltage dividing node 240 at an inverted input section thereof. The comparator 210 is further connected to the reference voltage source section 22 at an non-inverted input section thereof. The comparator 210 is further connected to one input section of the logic circuit section 30 at an output section thereof.

A configuration of the reference voltage source section 22 will be described below. The non-inverted input section of the comparator 210 and the ground are connected to a positive electrode and a negative electrode of the reference voltage source (VREF) 220, respectively.

An operation of the booster circuit according to the present embodiment will be described below.

Figure 7:
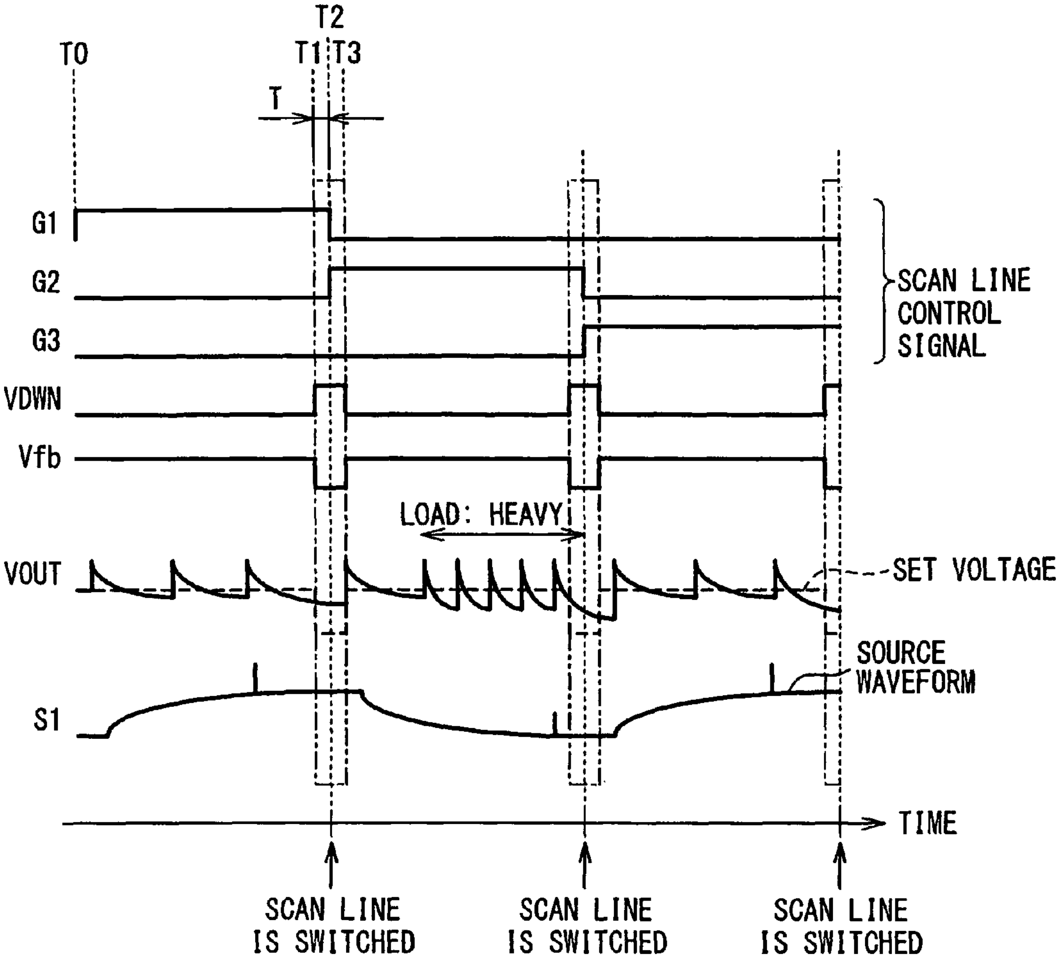
FIG. 7 is a diagram for explaining various signals in the booster circuit according to the first embodiment of the present invention.

FIG. 7 is a diagram for explaining various signals in the booster circuit according to the present embodiment. Graphs of G1, G2 and G3 represent time variations of first, second and third gate control signals. A graph of VDWN represents time variation of the external synchronizing signal VDWN. The feedback voltage VFB and the output voltage VOUT are the voltages at the voltage dividing node 240 and the booster voltage output section 112, respectively. S1 represents time variation of the source line signal. Although gate lines other than the G1 to G3 and source lines other than S1 are not shown in FIG. 7, an arbitrary number of the gate lines and source lines can be used.

The operation of the booster circuit according to the present embodiment will be described with reference to FIG. 7. In a period from T0 to T1, the gate control signal G1 is in the High state, and G2 and G3 are in the Low state. The external synchronizing signal VDWN is in the Low state. As for the S1, the voltage transitionally increases in accordance with the booster operation of the booster circuit. In addition, in S1, the voltage suddenly changes many times. This is due to an influence of a high-frequency signal caused by the switching operation in the booster operation of the DC/DC converter 11.

In this state, the output voltage VOUT increases and decreases in accordance with the booster operation in the booster circuit. Hereinafter, the operation of the booster circuit is classified into two modes; a period during which the output voltage VOUT increases is referred to as a "charge mode", and a period during which the output voltage VOUT decreases is referred to as a "discharge mode".

First, the "discharge mode" of the charge pump 10 will be described in detail. The external clock signal CLK repeatedly changes between the High state and the Low state. Although the change in the external clock signal CLK is generally periodical, it is not necessarily periodical. When the external clock signal CLK is in the Low state or the output (EN) of the feedback circuit section 20 is in the Low state, the output (CLKIN) of the logic circuit section 30 is in the Low state. That is, the clock signal (booster operation control signal) CLKIN supplied to the clock signal input section 113 of the DC/DC converter 11 also is in the Low state. When the clock signal (booster operation control signal) CLKIN is in the Low state, the DC/DC converter 11 charges electrical charges supplied from the voltage input section 111 into the booster capacitor 12. At this time, the DC/DC converter 11 connects the positive electrode and the negative electrode of the booster capacitor 12 to the voltage input section 111 and the ground 19, respectively.

Meanwhile, the output capacitor 13 is discharging. In the charge mode of the charge pump 10 described later, the output capacitor 13 stores electrical charges therein. As the output capacitor 13 supplies electrical power to an arbitrary external circuit connected to the booster voltage output section 112 of the booster circuit, the voltage of the output capacitor 13 gradually decreases.

The voltage of the output capacitor 13 is divided by the voltage dividing circuit section 24, and the feedback voltage VFB is output from the voltage dividing node 240. The feedback voltage VFB is input to the comparison circuit section 21 and compared with the reference voltage VREF. The reference voltage VREF is designed such that the reference voltage VREF is equal to the feedback voltage VFB when the output capacitor 13 discharges and needs to be recharged. When the voltage of the output capacitor 13 decreases and the feedback voltage VFB becomes equal to or smaller than the reference voltage VREF, the output (EN) of the comparison circuit section 21 changes from the Low state to the High state. As a result, the operation mode of the charge pump 10 changes from the discharge mode to the charge mode.

Note that the above-mentioned combination of the High state and the Low state is merely an example. In other words, the High state and the Low state of each of the external clock signal CLK, the output (EN) of the feedback circuit section 20 and the clock signal CLKIN may be reversed. In this case, as a matter of course, it is necessary to appropriately change and reinterpret the operation or a truth table of the logic circuit section 30.

Next, the "charge mode" of the charge pump 10 will be described below. When the external clock signal CLK is in the High state and the output (EN) of the feedback circuit section 20 is in the High state, the output (CLKIN) of the logic circuit section 30 is in the High state. The clock signal CLKIN supplied to the clock signal input section 113 of the DC/DC converter 11 is in the High state. When the clock signal CLKIN is in the High state, the DC/DC converter 11 shares electrical charges in the booster capacitor 12 with the output capacitor 13. In other words, as opposed to the case of the discharge mode, the DC/DC converter 11 connects the negative electrode of the booster capacitor 12 to the voltage input section 111. Furthermore, the DC/DC converter 11 connects the positive electrode of the booster capacitor 12 to the booster voltage output section 112 The serially-connected booster capacitor 12 and voltage input section charge the output capacitor 13 connected to the booster voltage output section 112. At this time, the switching operation of switching various connections may generate high-frequency noise, which may affect an external circuit connected to the booster voltage output section 112.

In the charge mode, the booster capacitor 12 discharges and the output voltage VOUT rises. At the same time, the feedback voltage VFB also rises. When the feedback voltage VFB exceeds the reference voltage VREF, the output (EN) of the comparison circuit section 21 is changed to the Low state. Therefore, the operation mode of the charge pump 10 changes from the charge mode to the discharge mode.

It should be noted that, in general, charging of the output capacitor 13 completes almost instantly.

The reduction rate of the voltage of the output capacitor 13 depends on power consumption of the external circuit to which electric power is supplied from the output capacitor 13. Therefore, if the power consumption of the external circuit varies, the cycle of switching between the charge mode and the discharge mode of the charge pump 10 also varies. In other words, when the load of the external circuit increases, the switching cycle becomes shorter. Conversely, when the load of the external circuit decreases, the switching cycle becomes longer.

Next, a period from T1 to T3 will be described with reference to FIG. 7. In the period from T1 to T3, the external synchronizing signal VDWN shifts from the Low state to the High state. When the external synchronizing signal VDWN is in the High state, the switch 247 is turned OFF. Therefore, the resistance value (R1) of the variable resistor 243 is increased and the voltage dividing ratio of the voltage dividing circuit section 24 is changed. As a result, the feedback voltage VFB is lowered as compared with the case where the external synchronizing signal VDWN is in the Low state.

At a time T2 within the period from T1 to T3, the gate control signal G1 is switched from the High state to the Low state, and instead, the gate control signal G2 is switched from the Low state to the High state. This means that the active scan line in a display device is switched from G1 to G2.

In FIG. 7, a time from T1 to T2 and a time from T2 to T3 are equal to each other, which is hereinafter referred to as "T". The time T corresponds to a time required for stabilizing the voltage to a predetermined voltage if the booster operation occurs in a period other than the period from T1 to T3. When the power source noise removal ratio is considered, an amount of noise on the booster voltage output section is empirically smaller than a normal signal driving amplitude by one digit or more. Therefore, the period T may be designed to be 10% of one scan period or more.

Moreover, the variation amount of the resistance value of the variable resistor 243 is designed such that a voltage applied to both ends of the variable resistor 243 becomes about twice as much as an output ripple voltage. The reason is as follows: when there is a larger difference between the voltages, a ripple difference between the higher set voltage and the lower set voltage becomes large, which affects an average output voltage. Therefore, it is generally desirable that the difference between the two set voltages due to difference of the external synchronizing signal VDWN is designed to be within about a few 100 mV.

According to the present embodiment, as shown in FIG. 7, the set voltage is lowered during the period when the external synchronizing signal VDWN is in the Low state, as indicated by a broken line. In other words, the set voltage is lowered in the period around the switching timing (T2) of the active scan line. Therefore, the output voltage VOUT hardly becomes lower than the lowered set voltage during this period, even with voltage drop due to the load connected to the booster voltage output section 112. Thus, during this period, the feedback signal (comparison result signal) EN output from the comparison circuit section 21 of the feedback circuit section 20 is likely to be in the Low state. As a result, the booster operation (charging operation) of the booster circuit hardly occurs during this period.

According to the present embodiment, as described above, variation in the output voltage VOUT due to the booster operation is small during the period in the vicinity of switching of the active scan line. Since the booster operation of the DC/DC converter 11 causes ripple noise at the time of the switching, the ripple noise may be imposed on the output booster voltage. This is apparent from the waveform S1 of the source line shown in FIG. 7. However, since the source line is under being driven, even when the voltage shifts due to the ripple noise, the voltage can be stabilized to a predetermined voltage as long as the driving period remains for the time "T" or more. In the last period "T" during the driving period of the source line, the threshold value of the booster operation is changed because the resistance value R1 of the variable resistor 243 is changed. Since the DC/DC converter 11 does not perform the booster operation in accordance with the control by the feedback circuit section 20, display is not affected.

As another possible problem, overdischarge in the booster voltage output section 112 can be caused for artificial reasons such as contact of the liquid crystal display panel with an external environment. A malfunction that the above-mentioned switching period (T) becomes longer can occur by a malfunction of a display control signal due to an effect of noise and the like. However, since the set voltage is changed according to the present embodiment, the DC/DC converter 11 restarts the booster operation when the feedback voltage VFB becomes lower than the lower set voltage. In other words, the booster circuit in the present embodiment has a recovery function with respect to various malfunctions.

As described above, the switching timing of the feedback signal (comparison result signal) EN output from the feedback circuit section 20 can be controlled by using the plurality of set voltages in the comparator 210. The voltage input to the feedback circuit section 20 is adjusted in synchronization with the external synchronizing signal VDWN from the display device, and thereby the booster operation is constricted in a period immediately before the switching of the scan line. As a result, feedback control which does not affect display of the display device can be achieved.

(Second Embodiment)

Figure 8A:
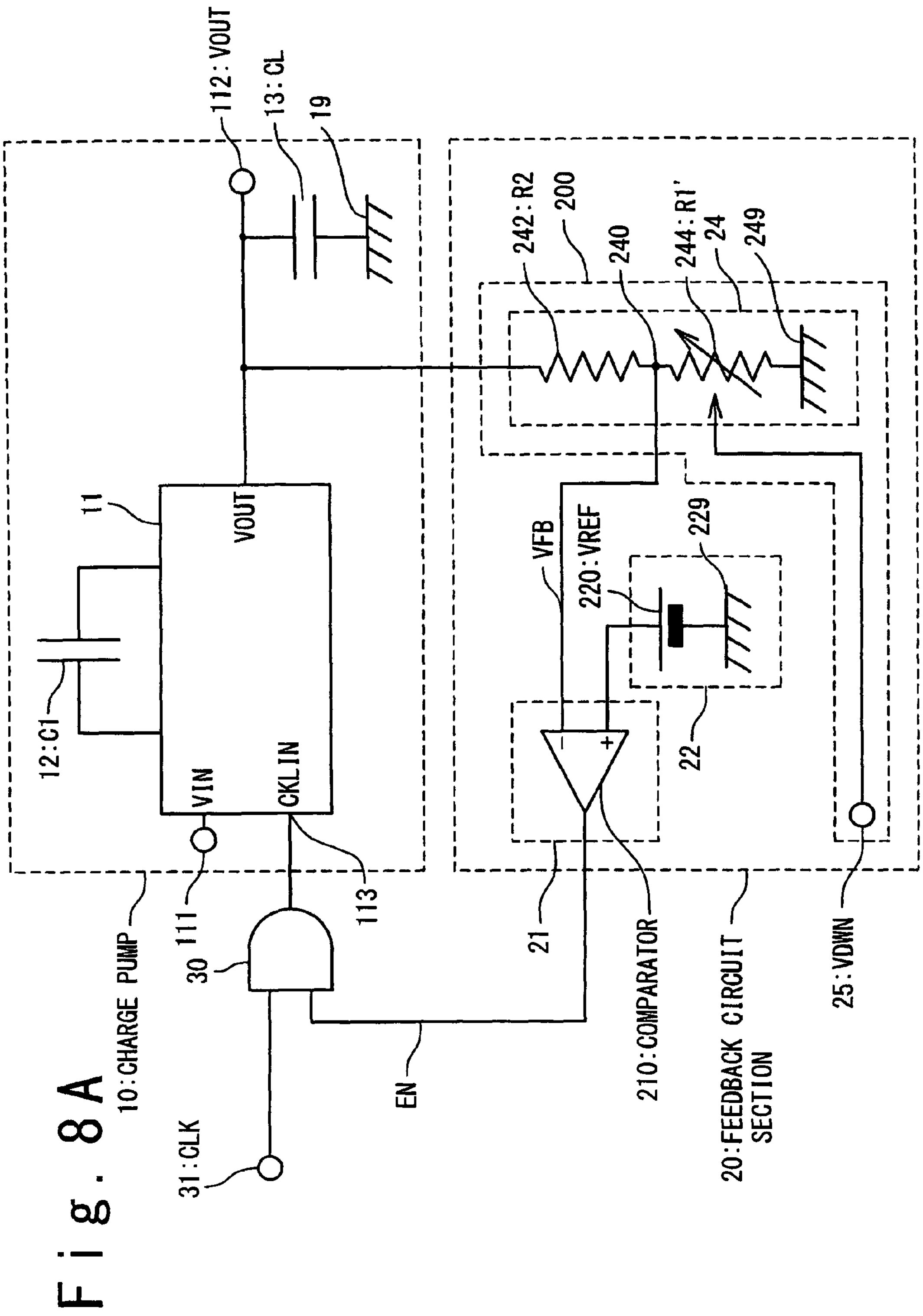
FIG. 8A is a circuit diagram showing a booster circuit according to a second embodiment of the present invention.
Figure 8B:
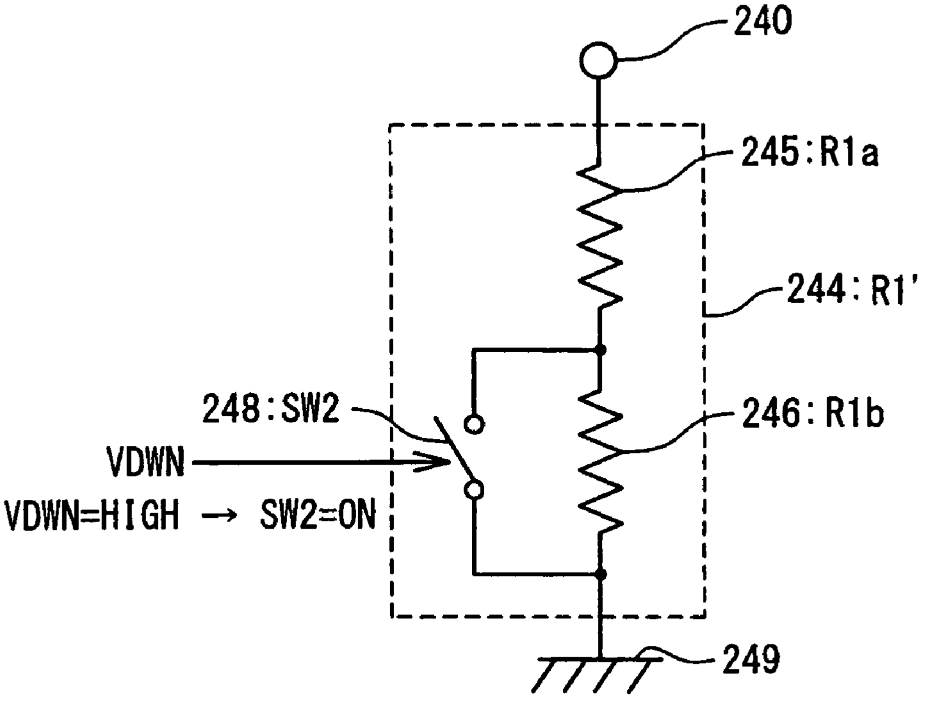
FIG. 8B is a detailed circuit diagram showing a voltage dividing circuit section 24 in the booster circuit according to the second embodiment.

FIG. 8A is a circuit diagram showing the booster circuit according to a second embodiment of the present invention. FIG. 8B is a detailed circuit diagram showing the voltage dividing circuit section 24 in the booster circuit according to the second embodiment.

A configuration of the booster circuit in the present embodiment is the same as the configuration in the first embodiment except for the following one point. The difference in the configuration of the booster circuit between the present embodiment and the first embodiment is the switch in the variable resistor. In the foregoing first embodiment, the switch (SW1) 247 that is the Low-active type is used in the variable resistor 243. In the present embodiment, however, a switch (SW2) 248 that is a High active type is used in a variable resistor 244. In other words, when the external synchronizing signal VDWN supplied to the external synchronizing signal input section 25 is in the High state (activated state), the switch 248 is short-circuited. Conversely, when the external synchronizing signal is in the Low state (deactivated state), the switch 248 is turned into a non-conductive state.

Since the other configuration of the booster circuit in the present embodiment is the same as in the first embodiment, description thereof is omitted.

Figure 9:
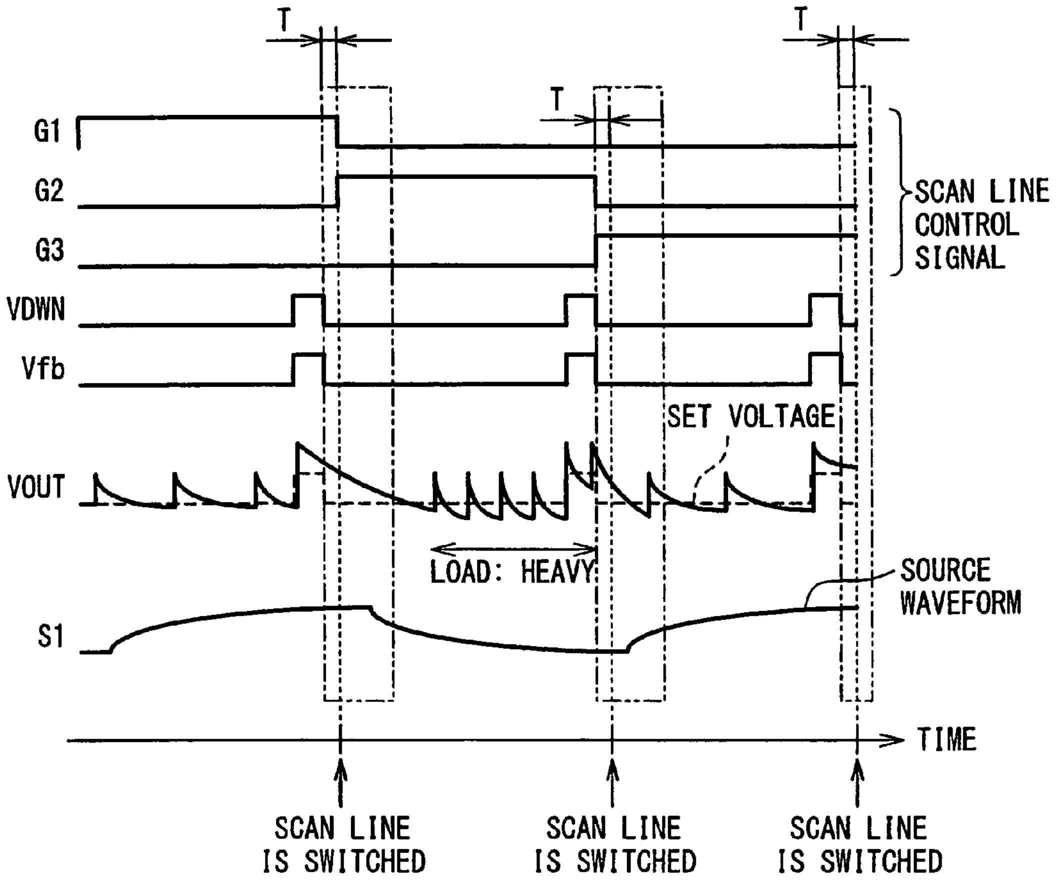
FIG. 9 is a diagram for explaining various signals in the booster circuit according to the second embodiment of the present invention.

FIG. 9 is a diagram for explaining various signals in the booster circuit according to the present embodiment.

According to the foregoing first embodiment, the set voltage before and after the switching of the scan line is decreased by increasing the resistance value (R1) of the variable resistor 243 in the feedback circuit section 20. Conversely, according to the present embodiment, the set voltage before and after the switching of the scan line is increased by decreasing the resistance value (R1') of the variable resistor 244 in the feedback circuit section 20.

According to the present embodiment, as shown in FIG. 9, the external synchronizing signal VDWN is in the High state for a certain period before a timing that is the time "T" before the switching of the scan line. In other words, the set voltage is increased for a certain period before a timing that is the time "T" before the switching of the scan line. This induces the booster operation during the certain period before the switching of the scan signal, which prevents occurrence of the booster operation in a period immediately before and after the switching of the scan line as in the first embodiment.

An object of the present embodiment also is to prevent occurrence of the booster operation in the same predetermined period as set in the first embodiment. As a method for achieving this, the set voltage is increased in the above-mentioned certain period before the switching of the scan line, in order to intentionally cause the booster operation beforehand. The output voltage VOUT is increased beforehand in this manner, and thus the feedback circuit section 20 does not operate in the vicinity of the switching of the scan line even if the output voltage VOUT is decreased due to the external load.

In general, as described above, the capacity (C1) of the booster capacitor 12 is larger than a load of one scan line as a whole in the liquid crystal display panel. Therefore, there is no possibility that the voltage has to be boosted again in the period T after the booster operation.

The present embodiment is effective in a case where when two set values are set, a margin of the lower limit value of the output voltage VOUT cannot be secured. For example, when a basic set voltage is 5 V and an output voltage of an amplifier driver is 4.7 V, it is necessary to set the set voltage on the lower side in a range from 4.7 to 5 V. Considering the influence of the ripple noise and voltage drop in the period T due to the load, there is a high possibility that the booster operation occurs in the period T. In such a case, the method according to the present embodiment is especially effective. For example, in the above-mentioned case, the problem can be solved by setting the basic set voltage to 5 V and the set voltage on the higher side to 5.5 V.

As described above, the switching timing of the feedback signal (comparison result signal) EN output from the feedback circuit section 20 can be controlled by using the plurality of set voltages in the comparator 210. The voltage input to the feedback circuit section 20 is adjusted in synchronization with the external synchronizing signal VDWN from the display device, and thereby the booster operation is caused in the above-mentioned certain period before a timing that is the time "T" before the switching of the scan line. As a result, feedback control which does not affect display of the display device can be achieved.

(Third Embodiment)

Figure 10:
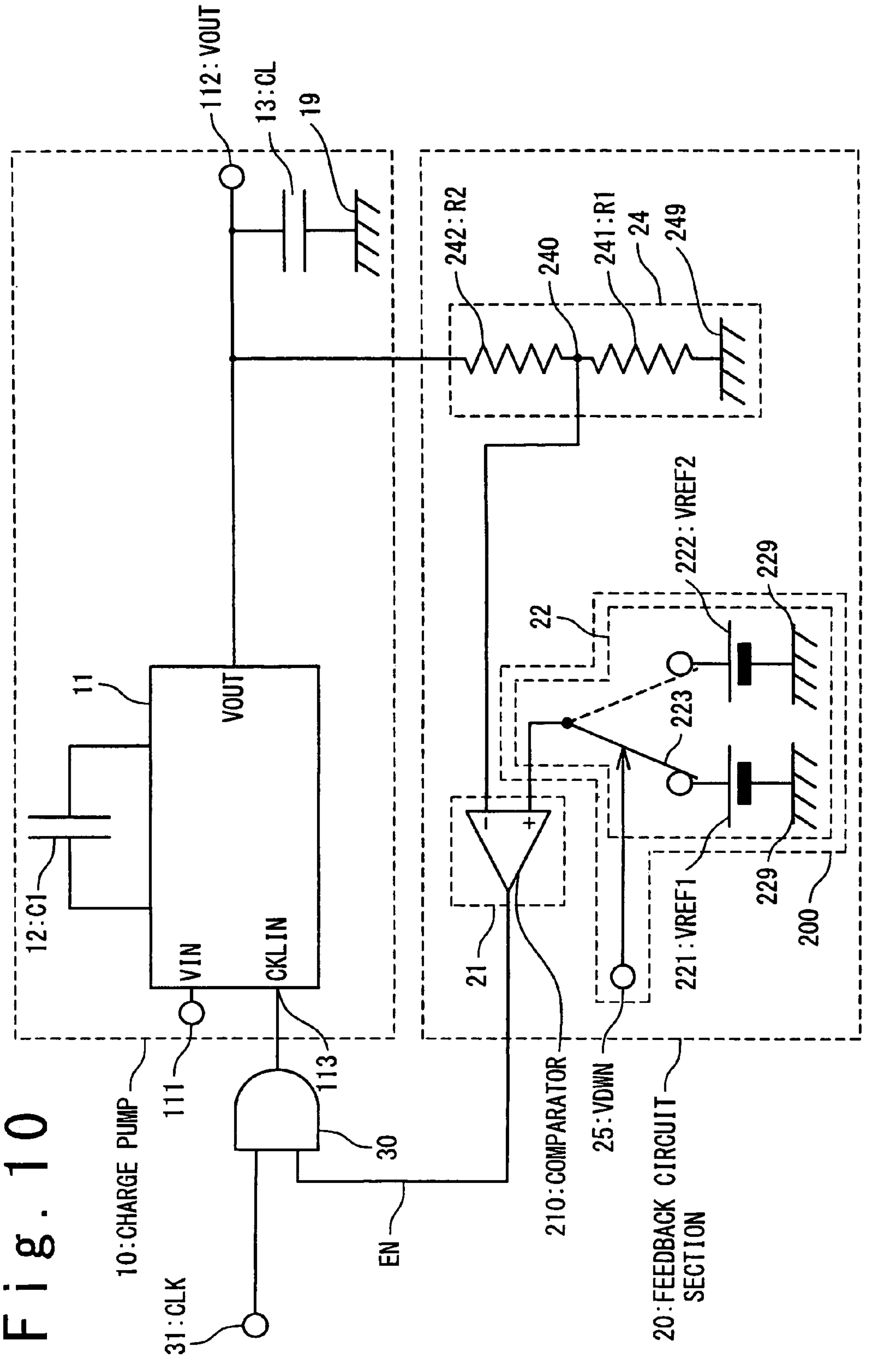
FIG. 10 is a circuit diagram showing a booster circuit according to a third embodiment of the present invention.

FIG. 10 is a circuit diagram showing the booster circuit according to the present embodiment.

A configuration of the booster circuit in the present embodiment is the same as the configuration of the booster circuit in the first embodiment or the second embodiment except for the following two points. The differences in the configuration of the booster circuit between the present embodiment and the first embodiment or the second embodiment are in the voltage dividing circuit section 24 and the reference voltage source section 22. The booster operation control section 200 according to the present embodiment includes the external synchronizing signal input section 25 and the reference voltage source section 22.

The voltage dividing circuit section 24 of the booster circuit in the first embodiment or the second embodiment includes the variable resistor 243 (R1) or 244 (R1') and the fixed resistor (R2) 242. However, the voltage dividing circuit section 24 of the booster circuit in the present embodiment includes two fixed resistors 241 (R1) and 242 (R2). The fixed resistor 241 in the present embodiment is not connected to the external synchronizing signal input section 25.

The reference voltage source section 22 in the first embodiment or the second embodiment includes the single reference voltage source 220. However, the reference voltage source section 22 in the present embodiment includes two reference voltage sources 221 (VREF1) and 222 (VREF2) and a reference voltage source selection switch 223. Here, the reference voltage source selection switch 223 electrically connects any one of the reference voltage sources 221 (VREF1) and 222 (VREF2) to the non-inverted node of the comparator 210. The reference voltage source selection switch 223 is connected to the external synchronizing signal input section 25 and switches the connection in accordance with the external synchronizing signal VDWN. The two reference voltage sources 221 and 222 are connected to the ground at the opposite side of the reference voltage source selection switch 223.

Since the other configuration of the booster circuit in the present embodiment is the same as in the first embodiment or the second embodiment, description thereof is omitted.

In the first embodiment or the second embodiment, the timing at which the output of the comparison circuit section 21 changes is changed by switching the ratio of the variable resistor 243 (R1) or 244 (R1') to the fixed resistor 242 (R2) in the feedback circuit section 20. In the present embodiment, various resistance values in the voltage dividing circuit section 24 are fixed. Instead, the timing at which the output (EN) of the comparison circuit section 21 changes is changed by switching the value of the reference voltage VREF in accordance with the external synchronizing signal VDWN. In other words, either one of the reference voltage source 221 (VREF1) or 222 (VREF2) is connected to the non-inverted node of the comparator 210 in accordance with the external synchronizing signal VDWN.

Two kinds of operating pattern are obtained depending on whether the external synchronizing signal VDWN is in the High state or the Low state, and whether the reference voltage VREF output from the reference voltage source section 22 connected to the comparator 210 is higher or lower than the set voltage. In either case, the timing chart of various signals is the same as that in FIG. 7 or FIG. 9, and detailed description of operation is omitted.

In the present embodiment, a total resistance value (=R1+R2) of the voltage dividing circuit section 24 is fixed. Accordingly, influence on the output voltage VOUT can be suppressed. In other words, since a feedback resistance load connected to the booster voltage output section 112 at all times is constant, variation in the output voltage VOUT due to the operation of the feedback circuit section 20 is advantageously small.

As described above, the switching timing of the feedback signal (comparison result signal) EN output from the feedback circuit section 20 can be controlled by using the plurality of set voltages in the comparator 210. The reference voltage VREF output from the reference voltage source section 200 and input to the comparator 210 is adjusted in synchronization with the external synchronizing signal VDWN from the display device. Thereby, the booster operation is constricted in a period immediately before the switching of the scan line. Alternatively, the booster operation is caused in the above-mentioned certain period before a timing that is the time "T" before the switching of the scan line. As a result, feedback control which does not affect display of the display device can be achieved.

(Fourth Embodiment)

Figure 11:
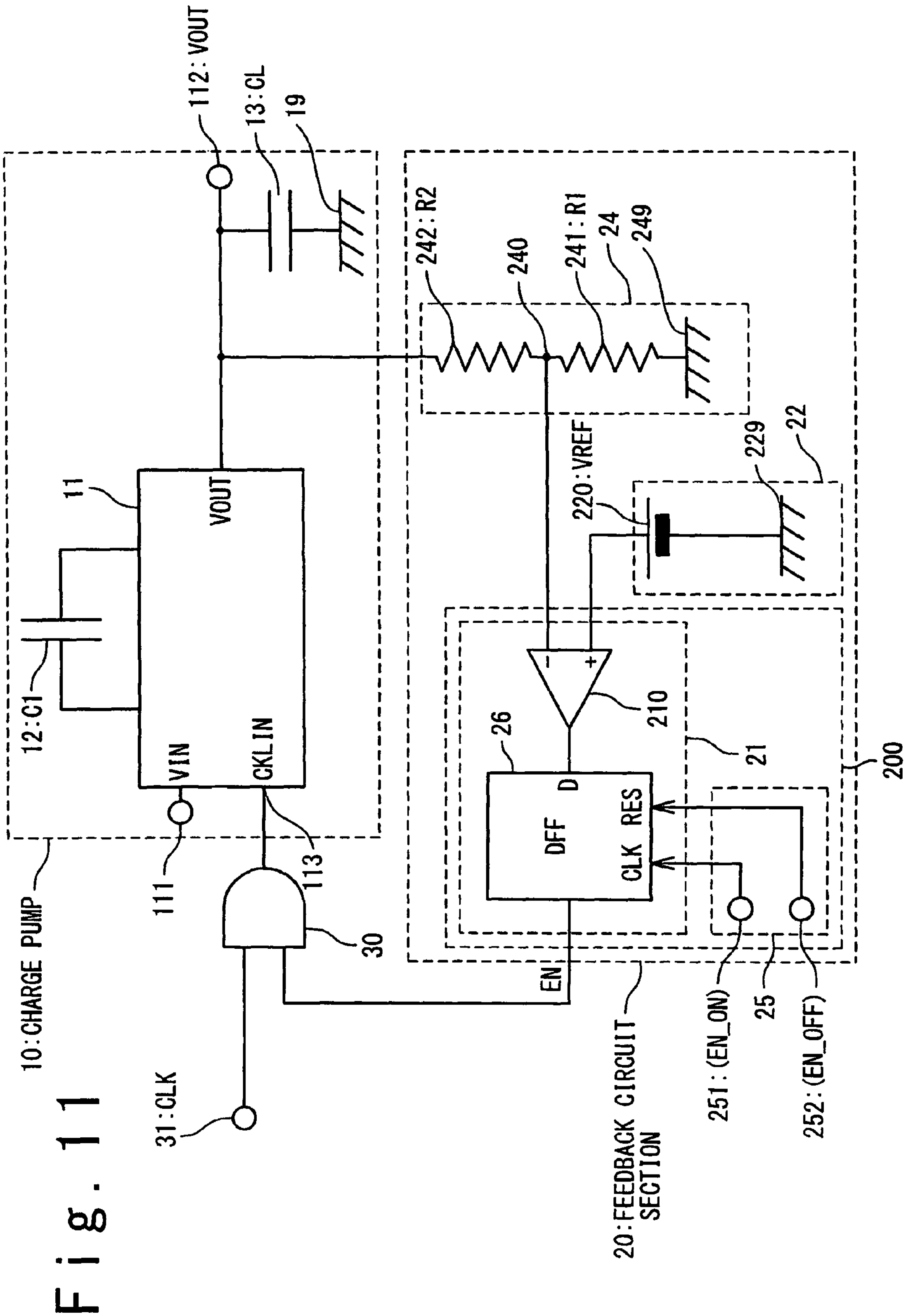
FIG. 11 is a circuit diagram showing a booster circuit according to a fourth embodiment of the present invention.

FIG. 11 is a circuit diagram showing a booster circuit according to the fourth embodiment.

A configuration of the booster circuit in the present embodiment is the same as the configuration of the booster circuit in the first embodiment or the second embodiment except for the following two points. The differences in the configuration of the booster circuit between the present embodiment and the first embodiment or the second embodiment are in the voltage dividing circuit section 24 and the comparison circuit section 21.

The voltage dividing circuit section 24 of the booster circuit according to the present embodiment has two serially-connected fixed resistors 241 (R1) and 242(R2). This configuration is the same as in the third embodiment, and detailed description thereof is omitted.

The comparison circuit section 21 of the booster circuit according to the present embodiment is obtained by adding a synchronizing circuit 26 to the comparison circuit section 21 in the first embodiment or the second embodiment. The output section of the comparator 210 and the external synchronizing signal input section 25 are connected to an input section of the synchronizing circuit 26. An output section of the synchronizing circuit 26 is connected to one input section of the logic circuit section 30.

In the foregoing first to third embodiments, the booster operation is controlled by making an operation reference point of the comparator 210 tunable and varying the point in synchronization with the external synchronizing signal VDWN. In the present embodiment, a plurality of external synchronizing signals are used in place of a plurality of set voltages. More specifically, the external synchronizing signal input section 25 includes a first external synchronizing signal input section 251 and a second external synchronizing signal input section 252. The plurality of external synchronizing signals include two kinds of external synchronizing signals EN_ON and EN_OFF which is, for example, display synchronizing signals output from the display device. The externally synchronizing signals EN_ON and EN_OFF are input to the first and second external synchronizing signal input sections 251 and 252, respectively. The two external synchronizing signals EN_ON and EN_OFF are used for setting a valid period and an invalid period of the feedback operation, respectively.

The synchronizing circuit 26 is realized by using, for example, a latch circuit or a delay flip flop (hereinafter referred to as "DFF"). In an example shown in FIG. 11, the output section of the comparator 210 is connected to a data signal input section ("D" in this figure) of the DFF. The first external synchronizing signal EN_ON for making the feedback operation valid is supplied to a clock signal input section ("CLK" in this figure) of the DFF. The second external synchronizing signal EN_OFF for making the feedback operation invalid is supplied to a reset signal input section ("RES" in this figure) of the DFF. The DFF delays outputting of the signal input to the data signal input section to timing corresponding to each state of the two external synchronizing signals EN_ON and EN_OFF. It is thus possible to secure a period during which the charge pump does not perform the booster operation, depending on the state of the display device.

In other words, the synchronizing circuit 26 in the present embodiment modulation-sets an output enable period in the valid period and the invalid period of the feedback operation. Describing more specifically, the synchronizing circuit 26 modulates the output waveform of the comparator 210 to provide a non-responsive period.

The feedback circuit section 20 in the present embodiment achieves a normal feedback operation except for the above-mentioned operation, and detailed description is omitted.

Figure 12:
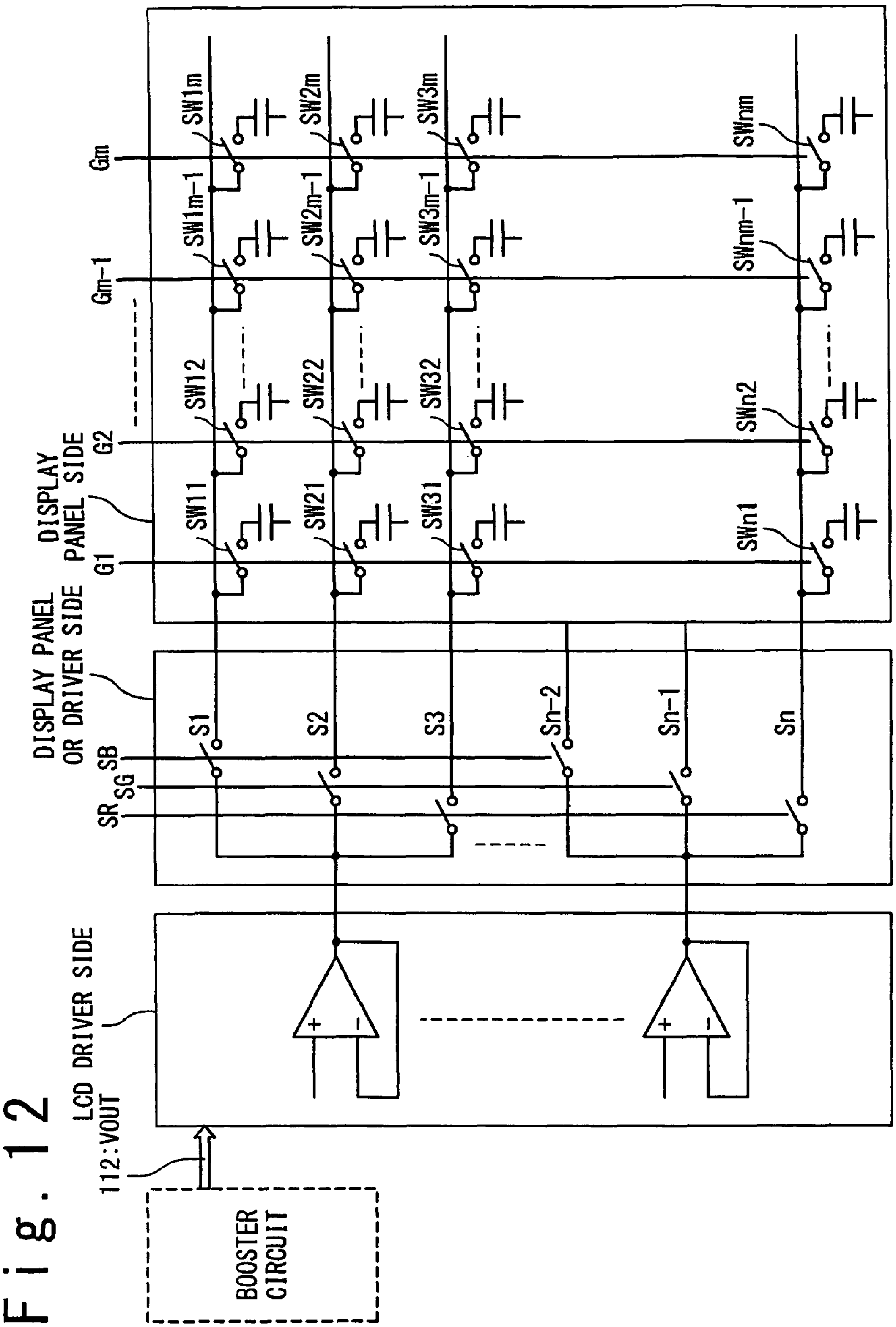
FIG. 12 is a configuration diagram showing a driver in a low-temperature polysilicon type liquid crystal display panel.

FIG. 12 is a configuration diagram showing a driver in a low-temperature polysilicon type liquid crystal display panel (hereinafter referred to as a "low-temperature polysili-panel").

Description is made that the booster circuit according to the present embodiment is especially effective when used as a power source for the low-temperature polysili-panel.

The low-temperature polysili-panel includes a plurality of switches for time-shared driving mainly on a liquid crystal display panel side and partly on a driver side. By using these time-shared driving switches, with a small number of amplifier drivers, the low-temperature polysili-panel enables driving of a large number of data lines.

For example, in the case of three time-shared driving in the example shown in FIG. 12, three source lines S1, S2 and S3 are driven by one amplifier. However, this requires three control signals SR, SG and SB for switching time-shared driving switches to which the amplifier is connected. In this case, the signals SR, SG and SB for switching the time-shared driving switches need to be regarded as being equivalent to a normal scan signal. The reason is as follows: until the source line switch signals SR, SG and SB are put into an OFF state, the output of the source line must be secured to a predetermined voltage, which is directly connected to the load of the liquid crystal display panel.

Figure 13:
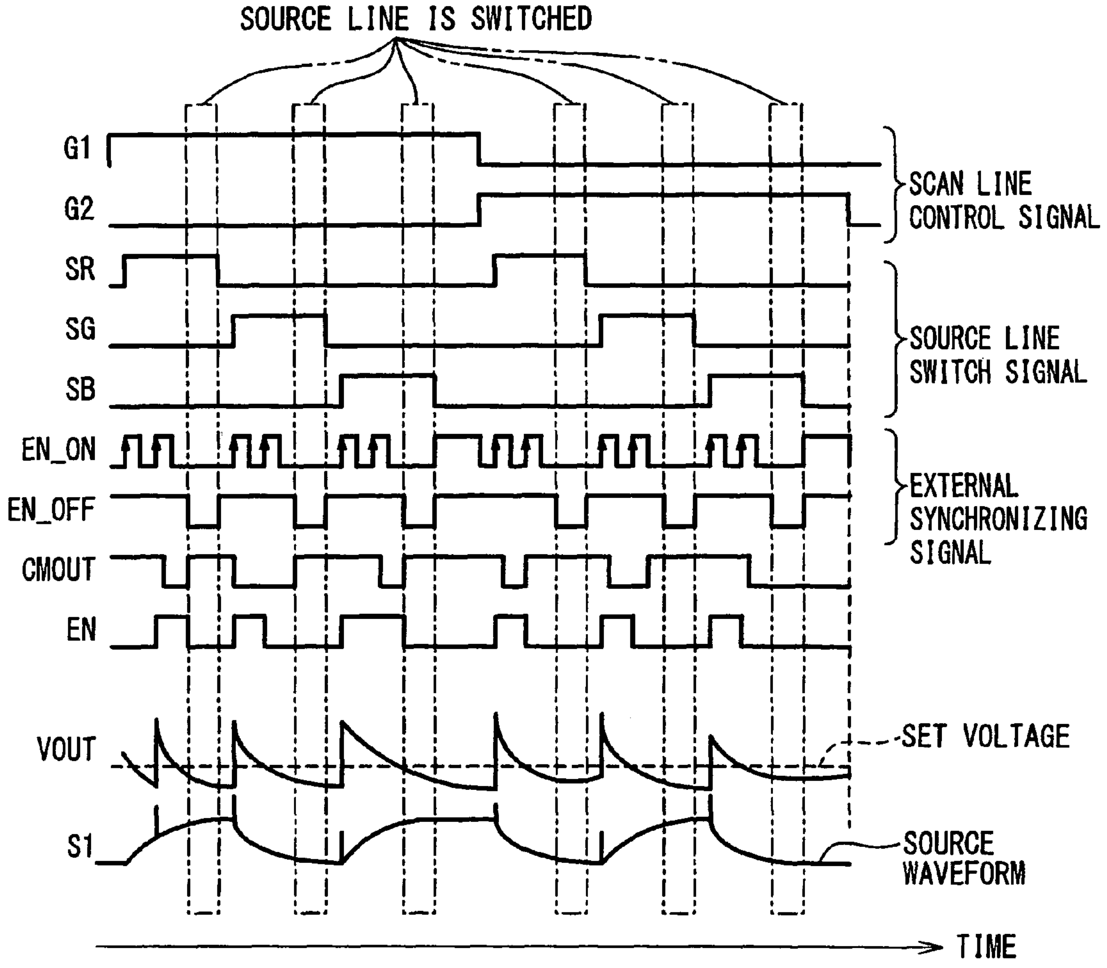
FIG. 13 is a diagram for explaining various signals in the booster circuit according to the fourth embodiment of the present invention.

FIG. 13 is a diagram for describing various signals in the booster circuit in the present embodiment. A horizontal axis represents time passage and a vertical axis represents various signals or voltages. Graphs of G1 and G2 represent changes in the first and second gate control signals with time, respectively. SR, SG and SB represent changes in the source line switch signals with time. EN_ON and EN_OFF represent changes in the two kinds of display signals with time. CMOUT represents a change in a signal which is output from the comparator 210 and supplied to the synchronizing circuit 26 with time. The feedback signal EN represents a change in a signal which is output from the synchronizing circuit 26 and supplied to the logic circuit section 30 with time. VOUT represents a change in the voltage at the booster voltage output section with time. S1 represents a change in the source line signal with time. Although gate lines other than G1 or G2 and source lines other than S1 are not shown in FIG. 13, any number of gate lines and source lines may be provided.

In FIG. 13, a region surrounded by a broken line represents timing at which driving of the source line is switched. Each time the gate lines G1, G2 become active, switching of the source line occurs three times. Since the frequency of switching driving becomes three times as much as conventional, it is difficult to change the set voltage in sync with switching of driving. Thus, the output of the feedback circuit section 20 is controlled by using the two external synchronizing signals EN_ON and EN_OFF and the synchronizing circuit 26. In this manner, the booster operation can be turned off in the vicinity of the timing at which the source line switch signals SR, SG and SB are put into the OFF state.

As described above, the switching timing of the feedback signal (comparison result signal) EN output from the feedback circuit section 20 can be controlled by using two signals in synchronization with the external synchronizing signal of the display device. Furthermore, a delay difference or a phase difference can be added to the feedback signal. In other words, feedback control which does not affect display of the display device can be achieved by using the booster circuit in the present embodiment as a power source for the liquid crystal display device.

The booster circuit especially suited to combine with the liquid crystal display device has been described. However, an intended purpose of the booster circuit of the present invention is not limited to combining with the liquid crystal display device. A main feature of the booster circuit of the present invention is that timing for performing the booster operation can be controlled by an external signal. As a result, the period when the booster operation is not performed can be secured. Therefore, it is expected that the booster circuit of the present invention is used in various ways other than in the liquid crystal display device.

It is apparent that the present invention is not limited to the above embodiments and may be modified and changed without departing from the scope and spirit of the invention.

What is claimed is:

1. A booster circuit comprising:

a charge pump configured to perform a booster operation that boosts a voltage supplied from an external power source and outputs the boosted voltage as an output voltage through an output capacitor; and a feedback circuit section configured to control said booster operation of said charge pump depending on said output voltage, wherein a mode of said booster operation includes:

a charge mode that charges said output capacitor with the voltage supplied from said external power source; and a discharge mode that discharges said output capacitor, wherein said mode of said booster operation is switched between said charge mode and said discharge mode depending on said output voltage, and wherein said feedback circuit section comprises a booster operation control section configured to secure a period during which said mode is not switched between said charge mode and said discharge mode in accordance with an external synchronizing signal.

2. The booster circuit according to claim 1, wherein said booster operation control section comprises a voltage dividing circuit section configured to voltage-divide said output voltage with a voltage dividing ratio varying depending on said external synchronizing signal and to output the divided voltage as a feedback voltage, and wherein said feedback circuit section further comprises:

a reference voltage source section configured to output a reference voltage; and a comparison circuit section configured to make a comparison between said reference voltage and said feedback voltage and to output a comparison result signal indicating the result of said comparison for controlling said booster operation.

3. The booster circuit according to claim 1, wherein said booster operation control section comprises a reference voltage source section configured to output a reference voltage varying depending on said external synchronizing signal, and wherein said feedback circuit section further comprises:

a voltage dividing circuit section configured to voltage-divide said output voltage and to output the divided voltage as a feedback voltage; and a comparison circuit section configured to make a comparison between said reference voltage and said feedback voltage and to output a comparison result signal indicating the result of said comparison for controlling said booster operation.

4. The booster circuit according to claim 1, wherein said feedback circuit section further comprises:

a voltage dividing circuit section configured to voltage-divide said output voltage and to output the divided voltage as a feedback voltage;

a reference voltage source section configured to output a reference voltage; and a comparison circuit section configured to make a comparison between said reference voltage and said feedback voltage and to output a comparison result signal indicating the result of said comparison for controlling said booster operation, and wherein said comparison circuit section comprises:

a comparator configured to make the comparison between said reference voltage and said feedback voltage and to generate said comparison result signal; and said booster operation control section that comprises a synchronizing circuit configured to output said comparison result signal after performing waveform modulation of said comparison result signal in accordance with said external synchronizing signal.

5. The booster circuit according to claim 4, wherein said external synchronizing signal comprises:

a first external synchronizing signal for stating said booster operation of said charge pump; and a second external synchronizing signal for stopping said booster operation of said charge pump, and wherein said booster operation control section further comprises:

a first external control signal input section to which said first external synchronizing signal is supplied; and a second external control signal input section to which said second external synchronizing signal is supplied.

* * * * *